United States Patent [19]
Chen et al.

[11] Patent Number: 5,793,659
[45] Date of Patent: Aug. 11, 1998

[54] METHOD OF MODULAR REDUCTION AND MODULAR REDUCTION CIRCUIT

[75] Inventors: Hong-Yi Chen; Wei-Xin Gai, both of Beijing, China

[73] Assignee: United Microelectronics Corporation, Taipei, Taiwan

[21] Appl. No.: 730,197

[22] Filed: Oct. 15, 1996

[51] Int. Cl.$^6$ .................. G06F 7/72; H04K 1/00
[52] U.S. Cl. .................. 364/746; 380/28; 380/29; 380/30; 364/736
[58] Field of Search .................. 364/746, 736; 380/28–30

[56] References Cited

U.S. PATENT DOCUMENTS

| | | | |
|---|---|---|---|
| 4,949,293 | 8/1990 | Kawamura et al. | 364/746 |
| 5,073,870 | 12/1991 | Morita | 364/746 |
| 5,144,574 | 9/1992 | Morita | 364/746 |
| 5,274,707 | 12/1993 | Schlafly | 380/30 |
| 5,373,560 | 12/1994 | Schlafly et al. | 380/30 |
| 5,499,299 | 3/1996 | Takenaka et al. | 380/28 |
| 5,572,454 | 11/1996 | Lee et al. | 364/746 |
| 5,644,639 | 7/1997 | Naciri et al. | 380/30 |

OTHER PUBLICATIONS

"A Method For Obtaining Digital Signatures and Public Key Cryptosystems," by Rivest et al., MIT Laboratory for Computer Science and Department of Mathematics (Feb. 1978).

*Primary Examiner*—Reba I. Elmore
*Assistant Examiner*—Richard Ho Musgrove
*Attorney, Agent, or Firm*—Rabin, Champagne, & Lynt, P.C.

[57] ABSTRACT

A method of modular reduction P mod Q based on a precomputation. Two quantities are precomputed and stored in a look-up table. Based on these stored precomputed quantities, two stages of partial modular reduction are performed. The result of the second stage of partial modular reduction is then adjusted according to the value of Q, to determine the modular reduction result. The modular reduction result may be provided to variable radix multiplication logic circuitry.

11 Claims, 5 Drawing Sheets

METHOD OF MODULAR REDUCTION AND MODULAR REDUCTION CIRCUIT

BACKGROUND OF THE INVENTION

1. Field of the Invention

The invention relates to a method of modular reduction, and more particularly, to a method of modular reduction based on precomputation, particularly for use in a fast multiplier as part of a cryptographic system. The invention also relates to logic for carrying out the method of the invention.

2. Description of the Related Art

Modular multiplication of two large numbers, e.g., 512 bits or longer, is the kernel operation in many public-key cryptography systems, such as RSA (Rivest, Shamir, Adleman; see Method For Obtaining Digital Signatures And Public Key Cryptosystems", Comm. of the ACM, Vol.21, No.2, pp.120–126, February 1978). Because modular multiplication is a low efficiency operation, it becomes a bottleneck in limiting the computation speed of public-key cryptographic systems.

There are several ways to increase multiplication speed. One is to reduce the number of partial products ($PP_j$) computed as part of the multiplication process. Another is to speed up the addition of the partial product array. Carry Save Addition (CSA) and Redundant Signed Digit (RSD) are two important arithmetic schemes which can be used to carry out addition or subtraction operations in O(1) time without resorting to the use of carry propagation techniques.

Generally, modular reduction algorithms can be divided into two types. One type utilizes a division operation, such as a fast division algorithm, using RSD arithmetic. The other type does not perform division, but rather uses, e.g. fast quotient estimation or other precomputation techniques.

The use of conventional precomputation techniques can speed up modular reduction. The principle behind such techniques is explained by the following example.

Referring to FIG. 1, consider a modular reduction operation, P mod Q, where P is an m-bit binary number and Q is an n-bit binary number. Note that U mod V=U−|U/V|V and U div V=|U/V| where U and V are random integers, where [ ] is a Gaussian mathematics symbol, for example, 5 mod 3=5−[5/3]*3=5−(1*3)=2. Limiting m and n such that m>n, there is defined a value k=m−n>1. Modular reduction includes three steps in this case: precomputating, partial modular reduction, and adjusting. A value $a_i=2^n \times i$ mod Q, with i=1,2, . . . ,$2^k-1$, is precomputed and the $2^k-1$ precomputed results $a_i$ (n bits) are stored in a look-up table memory 10.

The modular reduction step involves first computing a value v=P div $2^n$. A value P' is then computed, where P'=P mod $2^n$+$a_v$. The result P' of the modular reduction must then be adjusted, based on the value of Q. That is, because P' may still be larger than Q (although it may not exceed 3Q) after the modular reduction step, the adjusting step is needed for further modular reduction. If P'≧2Q, then P mod Q =P'−2Q. If, however, 2Q >P'≧Q, then P mod Q=P'−Q. Finally, if P'<Q, then no adjustment is necessary and P mod Q=P'.

However, the size of the look-up table memory 10 is ($2^k-1$)×n bits, which may be very large for large k and n. For example, it is necessary to store the precomputation results $a_1-a_{127}$ (each result $a_i$ has n=512 bits) in the look-up table memory when k=7, requiring 64K bits of memory. Thus, there still exists a need to reduce memory size in order to further reduce manufacturing costs associated with logic circuits for implementing the modular reduction.

SUMMARY OF THE INVENTION

It is therefore an object of the invention to provide a modular reduction method based on a precomputation scheme, which enables a reduction of the required memory size.

In order to achieve the object of the invention, a method for performing modular reduction P mod Q is provided, where P is an m-bit binary number and Q is an n-bit binary number, for k=m−n>1. The method includes the following steps. A value $a_i=2^n \times i \times d$ mod Q is precomputed for i=1 to $\lfloor(2^k-1)/d\rfloor$, where d is a predetermined integer. The precomputed results $a_i$ are then stored in a look-up table memory. A second value $b_j=2^n \times j$ mod Q is then precomputed for j=1 to d−1. The precomputed results $b_j$ are also stored in the look-up table memory.

A first partial modular reduction is performed using the precomputed results $a_i$ stored in the look-up table memory. A value u is calculated, where u=P div $2^n$. A value v is then calculated, where v=u div d. The first partial modular reduction is then calculated as P'=P mod $2^n$+(u mod d) $2^n$+$a_v$.

A second partial modular reduction is then performed using the precomputed results $a_i$ and $b_j$ stored in the look-up table memory. First, a value v' is calculated as v'=P' div $2^n$. The second partial modular reduction is calculated as P"=P' mod $2_n$+$a_1$ when v'=d, and P"=P' mod $2^{n+b}_{v'}$ when v'≠d.

The result of the modular reduction operation P mod Q is then calculated by making an adjustment, such that P mod Q=P"−2Q when P"≧2Q, P mod Q=P"−Q when P"≧Q, and P mod Q=P" when P"<Q.

BRIEF DESCRIPTION OF THE DRAWINGS

The invention can be more fully understood from the following detailed description of the preferred embodiment, with reference to the accompanying drawings, wherein.

DETAILED DESCRIPTION OF THE PREFERRED EMBODIMENT

Modular Reduction Based on Precomputation

Figure 1:
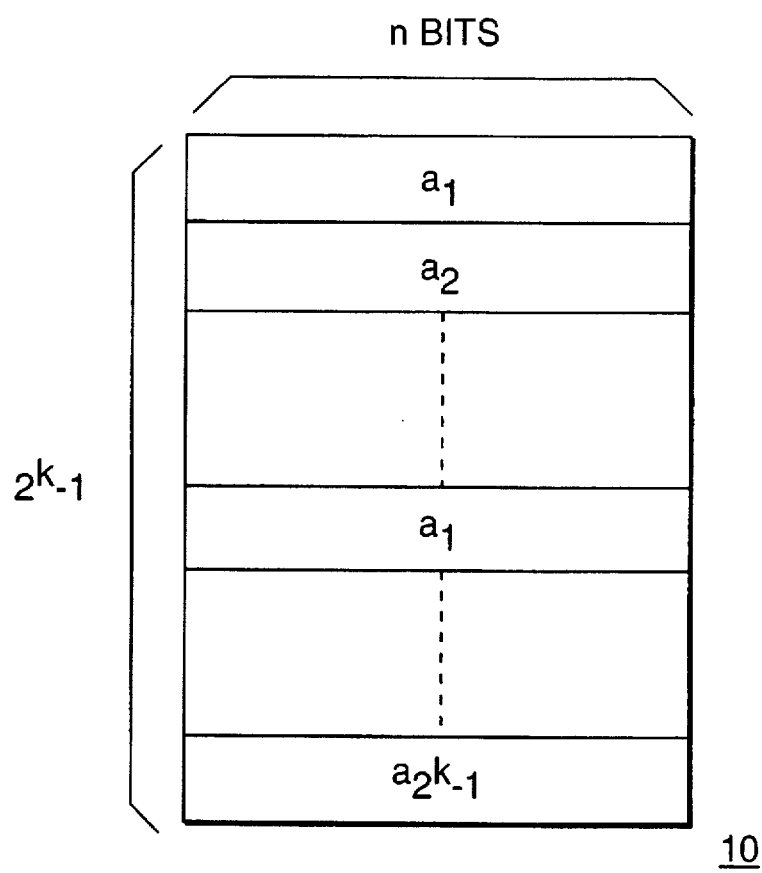
FIG. 1 is a schematic diagram of a look-up table memory storing $2^k-1$ precomputed results $a_i$ (each n bits wide), according to a conventional precomputation technique.

A precomputation technique of the invention has been developed to save storage space. Instead of precomputing $a_i=2^n \times i$ mod Q, with i=1, . . . ,$2^k-1$, as in conventional techniques, $a_i=2^n \times i \times d$ mod Q is precomputed, with i=1,2, . . . ,$\lfloor(2^k-1)/d\rfloor$, where d is an integer which has an optimal value of $\lfloor(2^k-1)^{1/2}\rfloor$+1 determined by differential analysis. A value $b_j=2^n \times j$ mod Q is also precomputed, with j=1,2, . . . ,d−1. Using this technique, the size of the memory required to store the precomputed results is reduced to $\lfloor(2^k-1)/d\rfloor$+d−1. For example, conventionally precomputing $a_i=2^n \times i$ mod Q with i=1, . . . ,$2^7-1$(k=7), the $2^7-1=127$ precomputed n-bit results $a_i$ must be stored in the look-up table memory 10 (as shown in FIG. 1) before a modular reduction can be performed according to the precomputed results $a_{127}$. In contrast, referring to FIG. 3, P mod Q can be calculated according to the invention by performing a first modular reduction according to the precomputed results $a_{12}$ stored in a look-up table memory 20 such as a RAM, then performing a second modular reduction according to the precomputed results $b_7$ in the look-up table memory 20 when i×d=10,20,30, . . . ,120; j=1,2,3 . . . 9; i=1,2, . . . ,12; k=7; and d=10. Thus, the size of required memory is reduced to storage for $|(2^7-1)/10|+9=21$ n-bit results.

Figure 2:
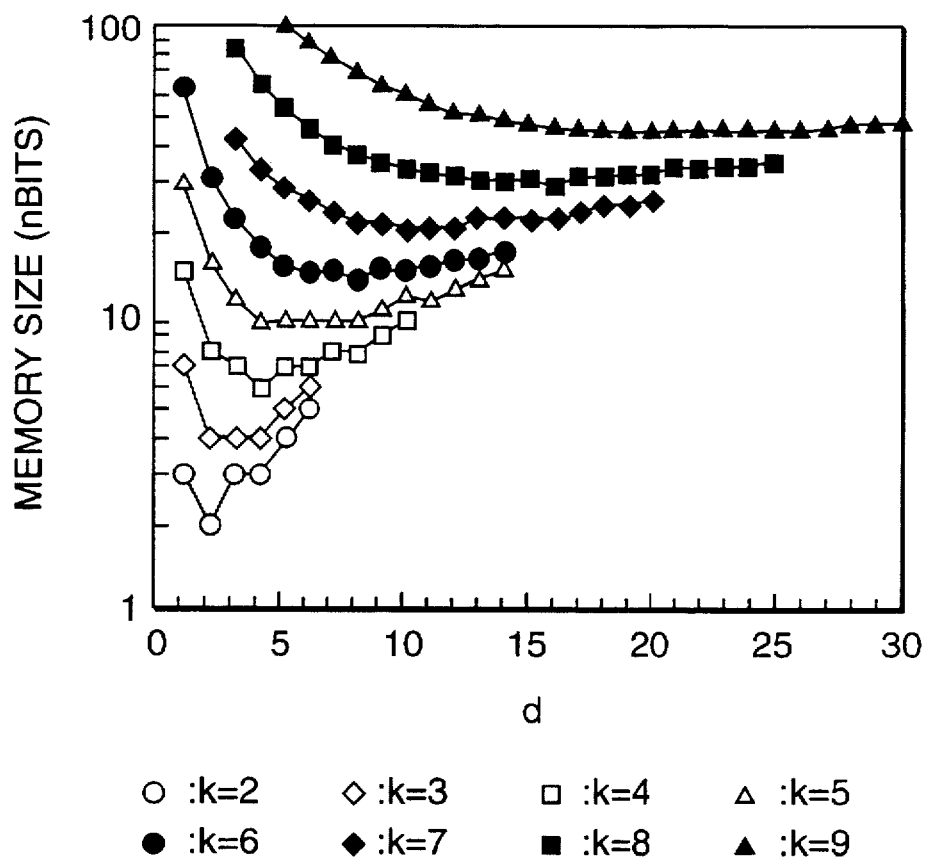
FIG. 2 is a graph plotting required memory size as a function of d for various values of k.

FIG. 2 is a graph of the required memory size as a function of d for various values of k. Holding k constant, a proper d can be selected to minimize $|(2^{k-1}-1)/d|+d-1$. Thus, the modular reduction process based on the precomputation technique is as follows.

First, an m-bit binary number P and an n-bit binary number Q are chosen, in order to calculate P mod Q. A value k is calculated, where k=m−n, and d is selected, preferably so as to minimize memory requirements, as previously described.

Precomputations are then performed to determine first and second precomputation results $a_i$ and $b_j$. The first precomputation result $a_i=2^n\times i\times d$ mod Q for i=1 to $|(2^k-1)/d|$. The second computation result $b_j=2^n\times j$ mod Q for j=1 to d−1. Using these precomputation results, partial modular reduction can be performed. First, a value u is calculated, where u=P div $2^n$. This value is then used to calculate v=u div d. The first partial modular reduction is then calculated as P'=P mod $2^n$+(u mod d) $2^n$+$a_v$. A second partial modular reduction is then performed. First, a value v' is calculated, where v'=P' div $2^n$. If v'=d, the second partial modular reduction P"=P' mod $2^n$+$a_1$, otherwise P"=P' mod $2^n$+$b_v$. The result of the modulation reduction P mod Q is then calculated by adjusting the second partial modulation reduction, such that P mod Q=P"−2Q, if P"≧2Q, P mod Q=P"−Q, if 2Q>P"≧Q, and P mod Q=P" if P"<Q.

The following is an example illustrating modular reduction based on the precomputation technique. P is set to 101011011010110; thus, m=15 bits. Q is set to 100101011, and n=9 bits. The ultimate result will be P mod Q.
Precomputation:

First, the value of k=m−n=15−9=6 is calculated. The value d is selected to be 8, which is optimal for memory minimization, as shown in FIG. 2.

Thus, $a_i$=i×8×$2^9$ mod Q, for i=1,2,3,4, . . . ,$|(2^k-1)/d|$. Therefore, for:

i=1, $a_1$=8×$2^9$ mod Q=11010001
i=2, $a_2$=16×$2^9$ mod Q=1110111
i=3, $a_3$=24×$2^9$ mod Q=11101
i=4, $a_4$=32×$2^9$ mod Q=11101110
i=5, $a_5$=40×$2^9$ mod Q=10010100
i=6, $a_6$=48×$2^9$ mod Q=111010
i=7, $a_7$=56×$2^9$ mod Q=100001011
Also, $b_j$=j×$2^9$ mod Q, for j=1,2, . . . ,d−1. Therefore, for:
j=1, $b_1$=1×$2^9$ mod Q=011010101
j=2, $b_2$=2×$2^9$ mod Q=001111111
j=3, $b_3$=3×$2^9$ mod Q=000101001
j=4, $b_4$=4×$2^9$ mod Q=011111110
j=5, $b_5$=5×$2^9$ mod Q=010101000
j=6, $b_6$=6×$2^9$ mod Q=001010010
j=7, $b_7$=7×$2^9$ mod Q=100100111

A first rough partial modular reduction is then performed. First, u=P div $2^9$=101011 (most significant 6 bits of P)=43 and v=|u/d|=|43/8|=5 are calculated. Thus, $a_5$ is selected for $a_v$, and P'=P mod $2^9$+(u mod d)$2^9$+$a_5$=(011010110+ 11000000000)+10010100=11011010110 (least significant 11 bits of P)+10010100=11101101010. Next, a second accurate partial modular reduction is performed. First, v'=P' div $2^9$=11 (most significant 2 bits of P')=3 is calculated. Thus, $b_3$ is selected and P"=P' mod $2^9$+$b_3$=101101010 (least significant 9 bits of P')+000101001=110010011. The second partial modular reduction is adjusted because 2Q>P"≧Q: 110010011−Q=1101000. Therefore, P mod Q=1101000.

Modular Reduction Determination Means

Figure 4:
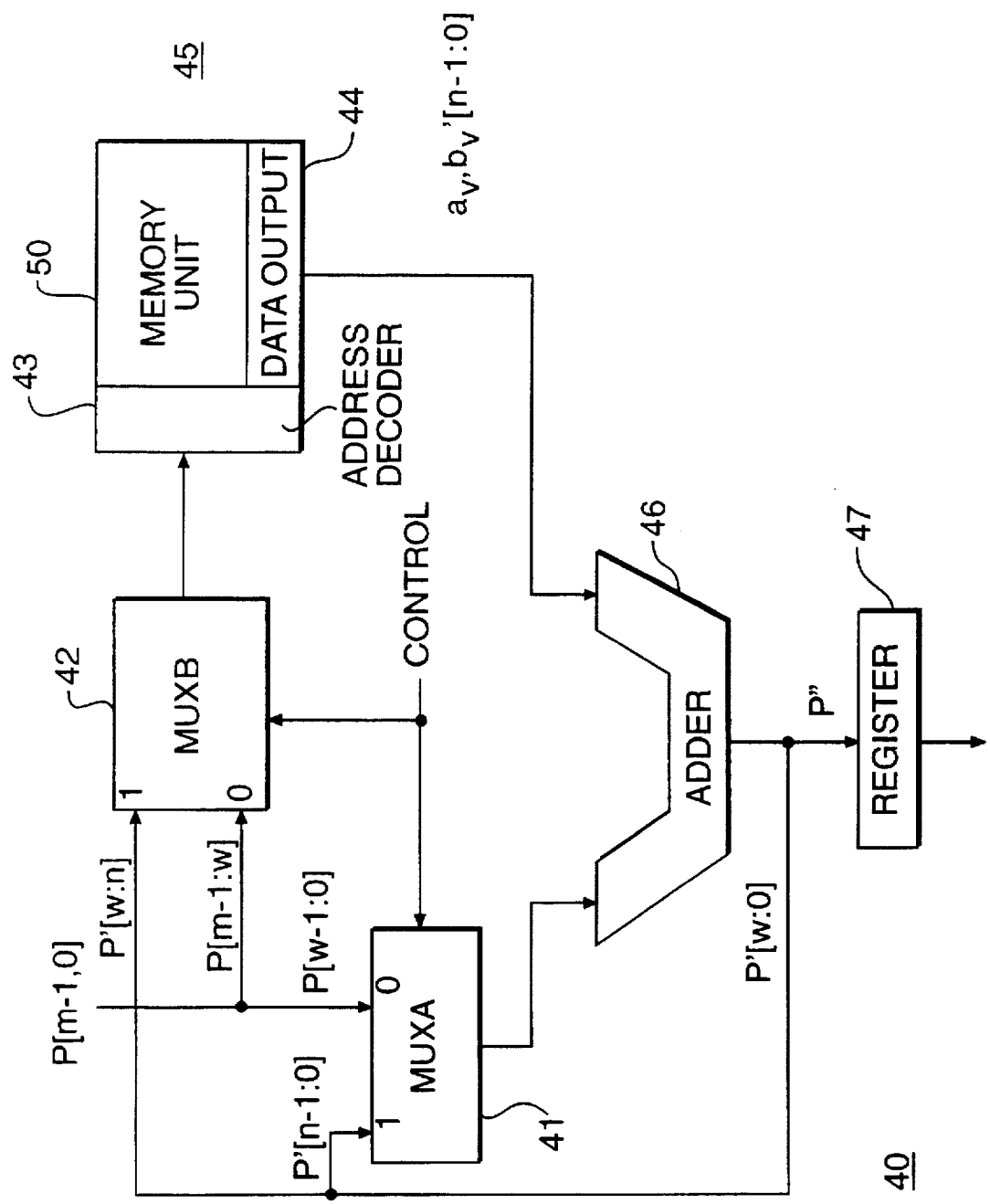
FIG. 4 is a schematic diagram of modular reduction determination means.

Referring to FIG. 4, logic circuits for carrying out the method may include discrete components, integrated circuits, and/or microprocessors. Given the above method of the invention, such logic designs would be implemented by the modular reduction determination means 40, and therefore, will be described in detail herein.

The modular reduction determination means 40 includes two multiplexers MUXA 41, MUXB 42, an adder 46 and a memory device 45 having a memory unit 20, an address decoder 43 and a data output 44. According to the example given above, an m-bit binary number P|m−1:0| and an n-bit binary number Q|n−1:0| are chosen. A value k is calculated, where k=m−n, w=k/2+n=|(m−n)/2|+n=(m+n)/2, and d is an integer which has an optimal value of $|(2^k-1)^{1/2}|+1 \approx |(2^k)^{1/2}|=|2^{k/2}|$ preferably so as to minimize memory requirements. Thus, the modular reduction process based on the precomputation technique is as follows.

Figure 3:
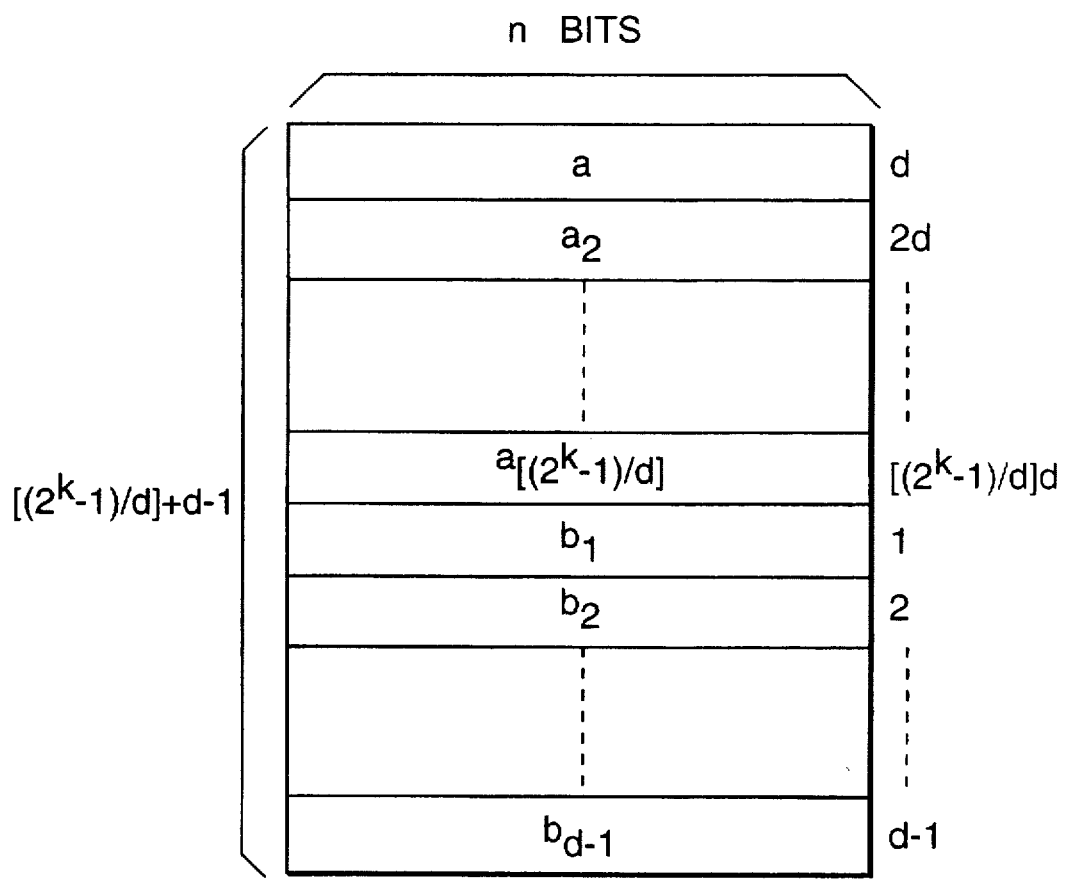
FIG. 3 is a schematic diagram of a look-up table memory storing $\lfloor(2^k-1)/d\rfloor$+d−1 precomputed results $a_i$ and $b_j$ (each n bits wide) according to the invention.

Precomputations are then performed to determine first and second precomputation results $a_i$ and $b_j$. The first precomputation result $a_i=2^n\times i\times d$ mod Q for i=1 to $|(2^k-1)/d|$, where d is an integer which has an optimal value of $|2^{k/2}|$ determined by differential analysis. The second computation result $b_j=2^n\times j$ mod Q for j=1 to d−1. The memory unit 20 stores the precomputed results $a_i$|n−1:0| according to the corresponding address i×d and $b_j$|n−1:0| according to the corresponding address j, as shown in FIG. 3.

One processing period consists of two clock cycles, the first clock cycle clocks the calculating formula u=P div $2^n$, v=u div d, and P'=P mod $2^n$+(u mod d)$2^n$+$a_v$, wherein P' is the first rough partial modular reduction result; the second clock cycle clocks the calculating formula v'=P' div $2^n$, P"=P' mod $2^n$+$a_1$ when v'=d ($a_1$=$b_d$) and P"=P' mod $2^n$+$b_{v'}$ when v'≠d, wherein P" is the second accurate partial modular reduction result.

During the first cycle, the signal CONTROL is low. Multiplexer MUXA 41 and MUXB 42 therefore selects channel 0 as the input. The most significant (m−n)/2 bits P|m−1:w| of the m-bit binary number P|m−1:0| are passed to the address decoder 43 from the channel 0 input of the multiplexer MUXB 42. Then the address decoder 43 decodes the most significant (m−n)/2 bits P|m−1:w| (i.e. u=P div $2^n$) as v of the memory address of the memory unit 20 so as to output the corresponding data $a_v$|n−1:0| through the data output 44 to the first terminal of the adder 46, wherein v=P|m−1:w| div d (i.e. v=u div d). The least significant w (=k/2+n) bits P|w−1:0| (i.e. P mod $2^n$+(u mod d) $2^n$) of the m-bit binary number P|m−1:0| are passed to the second terminal of the adder 46 from the channel 0 input of the multiplexer MUXA 41. By means of the addition of the data $a_v$|n−1:0| and the least significant w bits P|w−1:0| (i.e. P'=$a_v$+P mod $2^n$+(u mod d) $2^n$), the adder 46 generates the first rough partial modular reduction result having (w+1) bits, P'|w,0|.

During the second cycle, the signal CONTROL is high. Multiplexer MUXA 41 and MUXB 42 therefore selects channel 1 as the input. The most significant $(m-n)/2+1$ bits $P'|w:n|$ of the first partial modular reduction result $P'|w,0|$ are passed to the address decoder 43 from the channel 1 input of the multiplexer MUXB 42. Then the address decoder 43 decodes the most significant $(m-n)/2+1$ bits $P'|w:n|$ as v' of the memory address of the memory unit 20 so as to output the corresponding data $b_v|n-1:0|$ through the data output 44 to the first terminal of the adder 46, wherein $v'=P'|w:n|$ (i.e. $v'=P'$ div $2^n$). The least significant n bits $P'|n-1:0|$ of the first partial modular reduction result $P'|w,0|$ are passed to the second terminal of the adder 46 from the channel 1 input of the multiplexer MUXA 41. By means of the addition of the data $b_v|n-1:0|$ and the least significant n bits $P'|n-1:0|$(i.e. $P''=b_v+P'$ mod $2^n$ when $v'\leq d$), the adder 46 provides the second accurate partial modular reduction result, P", to the register 47.

Figure 5:
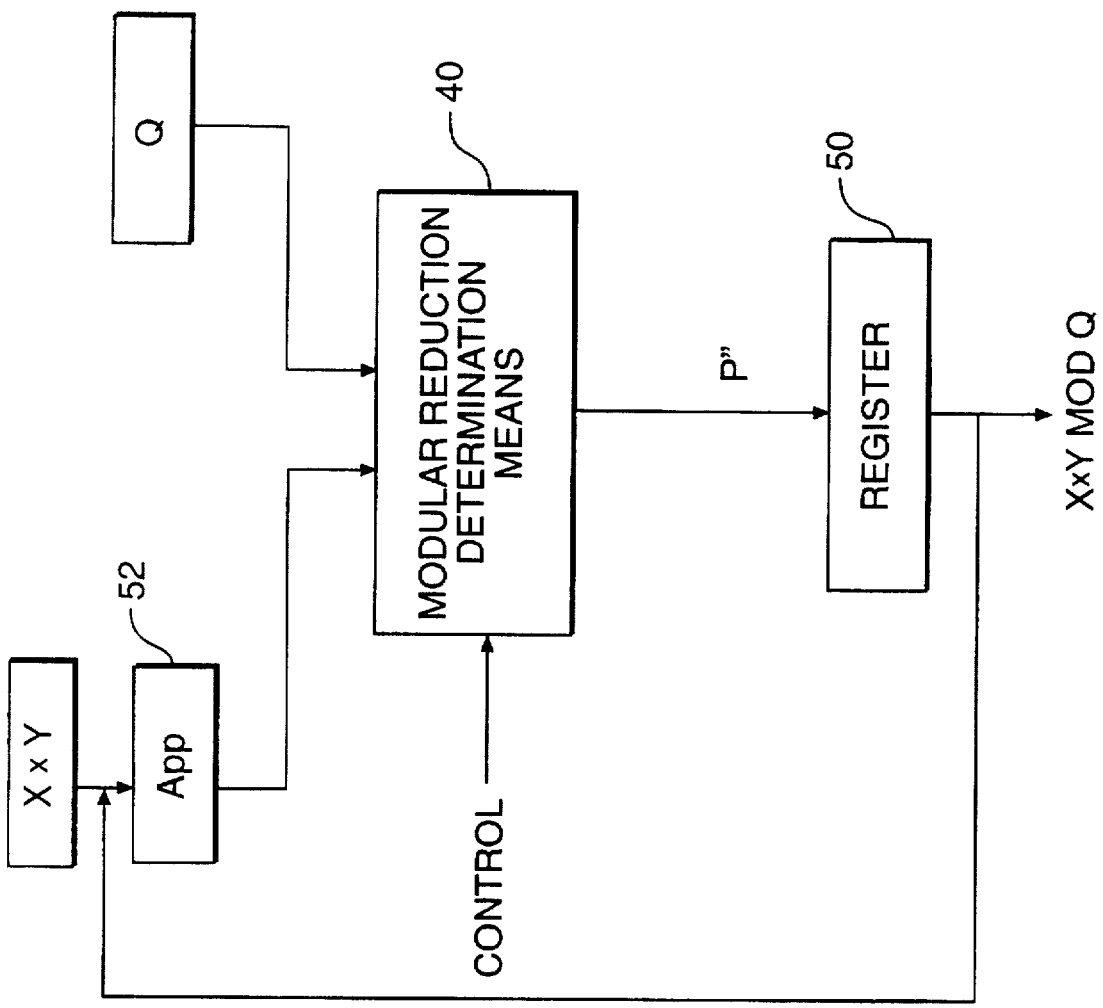
FIG. 5 is part of block diagram of a modular multiplication structure.

The precomputation modular reduction technique can be combined with variable radix multiplier coding to construct a fast modular multiplier in which modular reduction is performed during multiplication. Referring to FIG. 5, The inputs are multiplicand X, multiplier Y, and module Q. The desired output is $P=X\times Y$ mod Q. The addition of part of partial products of the $X\times Y$ operation is APP. The addition operation is accomplished by a partial product adder 52. The partial modular reduction result P" is generated by the modular reduction determination means 40 and is provided to the register 50. The partial modular reduction result P" is fed back to the partial product adder 52 for use as an input to the next addition operation of partial products of $X\times Y$. The required memory size is greatly reduced by this method.

The invention has been described with an exemplary preferred embodiment. However, it is to be understood that the scope of the invention is not limited to the disclosed preferred embodiment. To the contrary, it is intended to cover various modifications and similar arrangements. The scope of the claims, therefore, should be accorded the broadest interpretation so as to encompass all such modifications and arrangements.

What is claimed is:

1. A method of performing modular reduction, P mod Q, where P is an m-bit binary number, Q is an n-bit binary number, and $k=m-n>1$, comprising the steps of:
   (a) storing P;
   (b) storing Q;
   (c) calculating $k=m-n>1$;
   (d) precomputing $a_i=2^n\times i\times d$ mod Q, for i=1 to $[(2^k-1)/d]$, where d is a predetermined integer;
   (e) storing the precomputed results $a_i$ in a look-up table memory;
   (f) precomputing $b_j=2^n\times j$ mod Q, for j=1 to d-1;
   (g) storing the precomputed results $b_j$ in the look-up table memory;
   (h) performing a first partial modular reduction, according to the precomputed results $a_i$ stored in the look-up table memory, including the substeps of
   calculating $u=P$ div $2^n$,
   calculating $v=u$ div d, and
   calculating $P'=P$ mod $2^n+(u$ mod $d)$ $2^n+a_v$, wherein P' is the first partial modular reduction result;
   (i) performing a second partial modular reduction, according to the precomputed results $a_i$ and $b_j$ stored in the look-up table memory, including the substeps of
   calculating $v'=P'$ div $2^n$,
   calculating $P''=P'$ mod $2^n+a_1$ when $v'=d$ and
   calculating $P''=P'$ mod $2^n+b_{v'}$ when $v'\neq d$, wherein P" is the second partial modular reduction result; and
   (j) adjusting the second partial modular reduction result to determine P mod Q, including the substeps of
   determining P mod $Q=P''-2Q$ when $P''\geq 2Q$,
   determining P mod $Q=P''-Q$ when $2Q>P''\geq Q$,
   determining P mod $Q=P''$ when $P''<Q$.

2. The method as claimed in claim 1, wherein the look-up table has a memory size that is $(|(2^k-1)/d|+d-1)\times n$ bits.

3. The method as claimed in claim 1, wherein the look-up table memory is a RAM.

4. The method as claimed in claim 2, wherein d is an integer which has an optimal value of $|(2^k-1)^{1/2}|+1$.

5. The method as claimed in claim 1, further including the step of providing the modular reduction result P mod Q to variable radix multiplier logic.

6. An apparatus for performing modular reduction, P mod Q, comprising:
   (a) memory for storing P, wherein P is an m-bit binary number;
   (b) memory for storing Q, wherein Q is an n-bit binary number;
   (c) means for calculating $k=m-n>1$;
   (d) means for calculating $a_i=2^n\times i\times d$ mod Q, for i=1 to $[(2^k-1)/d]$, where d is a predetermined integer;
   (e) a look-up table memory for storing the precomputed results $a_i$;
   (f) means for calculating $b_j=2^n\times j$ mod Q, for j=1 to d-1;
   (g) a look-up table memory for storing the precomputed results $b_j$;
   (h) means for calculating $u=P$ div $2^n$;
   (i) means for calculating $v=u$ div d;
   (j) means for calculating $P'=P$ mod $2^n+(u$ mod $d)$ $2^n+a_v$, wherein P' is the first partial modular reduction result;
   (k) means for calculating $v'=P'$ div $2^n$;
   (l) means for comparing v' and d;
   (m) means for calculating $P''=P'$ mod $2^n+a_1$ when $v'=d$ and for calculating $P''=P'$ mod $2^n+b_{v'}$ when $v'\neq d$, wherein P" is the second partial modular reduction result;
   (n) means for comparing P" and Q; and
   (o) means for determining the modular reduction result P mod Q, wherein
   P mod $Q=P''-2Q$ when $P''\geq 2Q$,
   P mod $Q=P''-Q$ when $2Q>P''\geq Q$,
   P mod $Q=P''$ when $P''<Q$.

7. The apparatus as claimed in claim 6, wherein said look-up table memory has a size that is $([(2^k-1)/d]+d-1)\times n$ bits.

8. The apparatus as claimed in claim 6, wherein said look-up table memory is a RAM.

9. The apparatus as claimed in claim 7, wherein d is an integer which has an optimal value of $[(2^k-1)^{1/2}]+1$.

10. A modular apparatus, comprising:
   means for receiving an m-bit binary number $P|m-1:0|$;
   means for receiving an n-bit binary number $Q|n-1:0|$;
   an adder having a first input terminal, a second input terminal, and an output terminal, to provide, at the output terminal, a sum of signals present at the first input terminal and the second input terminal;
   means for receiving a clock signal defining a processing period having a first clock cycle and a second clock cycle;
   means for determining first precomputational results $a_i=2^n\times i\times d$ mod Q for i=1 to $|(2^k-1)/d|$ and second precomputation results $b_j=2^n\times j$ mod Q for j=1 to d-1, where $k=m-n$ and $d=|2^{k/2}|$;

a memory device for storing $a_i$ and $b_j$ according to separate respective addresses i×d and j;

a first multiplexer, for passing the most significant (m−n)/2 bits P|m−1:w|=v of P|m−1:0| to the memory device, during the first clock cycle, so that the corresponding data $a_v$|n−1:0| is provided by the memory device to the first input terminal of the adder, where w=(m+n)/2, and for passing the most significant (m−n)/2+1 bits P'|w:n|=v' of P'|w,0| to the memory device, during the second clock cycle, so that the corresponding data $b_{v'}$|n−1:0| is provided by the memory device to the first input terminal of the adder;

a second multiplexer, for passing the least significant w bits P|w−1:0| of P|m−1:0| to the second input terminal of the adder, during the first clock cycle, and for passing the least significant n bits P'|n−1:0| of P'|w,0| to the second input terminal of the adder, during the second clock cycle;

wherein the sum at the output terminal of the adder is a first partial modular reduction result P'|w,0| during the first clock cycle, and is a second partial modular reduction result during the second clock cycle.

11. The modular reduction apparatus as claimed in claim 10, wherein the memory device includes:

a address decoder for receiving and decoding the addresses v and v' from the first multiplexer;

a memory unit for fetching the data $a_v$|n−1:0| in response to the decoded address v and the data $b_{v'}$|n−1:0| in response to the decoded address v'; and a data output for providing the data $a_v$|n−1:0| to the first input terminal of the adder during the first cycle and the data $b_{v'}$|n−1:0| to the first input terminal of the adder during the second cycle.

\* \* \* \* \*